Patented July 16, 1935

2,008,558

UNITED STATES PATENT OFFICE 2,008,558

PROCESS FOR THE PRODUCTION OF DISPERSIONS OF CHLORINATED RUBBER

Walter Laufenberg and Richard Schwarz, Berlin-Tempelhof, Germany, assignors to firm Chemische Fabrik Buckau, Ammendorf, Germany, a corporation of Germany No Drawing. Application March 8, 1934, Serial No. 714,585. In Germany March 11, 1933

3 Claims. (Cl. 260—1)

This invention relates to a process for the production of dispersions of chlorinated rubber.

In connection with the employment of chlorinated rubber, it is often more advantageous, for both technical and economic reasons, to use aqueous emulsions, instead of solutions, of chlorinated rubber. It is known that such aqueous emulsions cannot be prepared from powdered solid chlorinated rubber and water alone. The existing practice of preparing such emulsions has consisted in emulsifying solutions of chlorinated rubber in organic solvents by the aid of highly efficient stirring mechanism or emulsifying machines, with the additional assistance, if necessary, of special emulsifiers.

It is the object of the present invention to produce stable dispersions of chlorinated rubber and to this end the process of the present invention consists in stirring finely divided solid chlorinated rubber in a liquid consisting substantially of water and a solvent for said chlorinated rubber. The chlorinated rubber, water and solvent may either be introduced simultaneously into the stirring apparatus and stirred together, or the chlorinated rubber may be introduced into, and stirred with, a mixture of water and the solvent. In either case, an excellent dispersion of the chlorinated rubber is obtained. The rapidity with which the dispersion is formed when only the three components: chlorinated rubber, water and solvent, are brought together, and the mixture then stirred, is astonishing. In this case, the chlorinated rubber itself appears to act as emulsifier. The emulsion is formed just as quickly when the chlorinated rubber is introduced with stirring, into a mixture of water and solvent. In this case also the chlorinated rubber seems to play the part of an emulsifier.

In all these cases, the dispersion of the chlorinated rubber occurs almost instantly when stirring commences. The tendency to dispersion is so great that the stirring can be performed with an ordinary stirring apparatus, and the employment of specially efficient, high-speed stirrers or dispersion machines, such as were hitherto needed in the emulsification of chlorinated rubber solutions becomes superfluous.

The advantage of the process of the present invention over the known working method, in which a solution of the chlorinated rubber is prepared, in the first place, and then emulsified in water, consists in that the troublesome and time-wasting initial dissolving of the chlorinated rubber is avoided, and that a far simpler apparatus is sufficient. The process of dispersion proceeds at an exceedingly rapid rate and does not require any special emulsifying agents.

Example 1

50 parts of toluene, 50 parts of water and 20 parts of pulverulent chlorinated rubber are introduced jointly into a stirring apparatus and stirred. A uniform and stable dispersion is formed in a few minutes.

Example 2

50 parts of toluene and 50 of water are brought together and intimately stirred, 20 parts of finely divided solid chlorinated rubber being added during the stirring operation. A uniform and stable dispersion is formed immediately.

What we claim is:

1. A process for the production of substantially stable dispersions of chlorinated rubber which consists in mixing solid pulverulent chlorinated rubber with a liquid mixture consisting substantially of water and a solvent for said chlorinated rubber by ordinary stirring methods.

2. A process for the production of substantially stable dispersions of chlorinated rubber which consists in bringing simultaneously together solid pulverulent chlorinated rubber, water and a solvent for the chlorinated rubber and mixing the whole by ordinary stirring methods.

3. A process for the production of substantially stable dispersions of chlorinated rubber which consists in introducing solid finely divided chlorinated rubber, substantially free from solvents, into a mixture of water and a solvent for the chlorinated rubber and mixing the whole by ordinary stirring methods.

WALTER LAUFENBERG.
RICHARD SCHWARZ.